US011710486B2

(12) United States Patent
Walters et al.

(10) Patent No.: US 11,710,486 B2
(45) Date of Patent: *Jul. 25, 2023

(54) REMOVAL OF IDENTIFYING TRAITS OF A USER IN A VIRTUAL ENVIRONMENT

(71) Applicant: Capital One Services, LLC, McLean, VA (US)

(72) Inventors: Austin Walters, Savoy, IL (US); Jeremy Goodsitt, Champaign, IL (US); Fardin Abdi Taghi Abad, Champaign, IL (US); Vincent Pham, Champaign, IL (US); Kenneth Taylor, Champaign, IL (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/303,968

(22) Filed: Jun. 11, 2021

(65) Prior Publication Data

US 2021/0304757 A1 Sep. 30, 2021

Related U.S. Application Data

(63) Continuation of application No. 16/723,546, filed on Dec. 20, 2019, now Pat. No. 11,043,219.

(51) Int. Cl.
*G10L 15/22* (2006.01)
*G10L 15/18* (2013.01)
(Continued)

(52) U.S. Cl.
CPC ............ *G10L 15/22* (2013.01); *G06T 13/205* (2013.01); *G06T 13/40* (2013.01); *G06T 19/003* (2013.01);
(Continued)

(58) Field of Classification Search
USPC ................ 704/231, 235, 246, 247, 251, 252
See application file for complete search history.

(56) References Cited

U.S. PATENT DOCUMENTS

| 8,117,550 | B1 | 2/2012 | Izdepski et al. |
| 11,043,219 | B1 | 6/2021 | Walters et al. |

(Continued)

OTHER PUBLICATIONS

Zaleski K., "Virtual Reality Could Be a Solution to Sexism in Tech", Feb. 19, 2016, 4 pages, Retrieved from [URL: https://qz.com/619859/virtual-reality-could-be-a-solution-to-sexism-in-tech/].

*Primary Examiner* — Leonard Saint-Cyr
(74) *Attorney, Agent, or Firm* — Harrity & Harrity, LLP

(57) ABSTRACT

A virtual environment platform may receive, from a user device, a request to access a virtual reality (VR) environment and may verify, based on the request, a user of the user device to allow the user device access to the VR environment. The virtual environment platform may receive, after verifying the user of the user device, user voice input and user handwritten input from the user device. The virtual environment platform may generate processed user speech by processing the user voice input, wherein a characteristic of the processed user speech and a corresponding characteristic of the user voice input are different and may generate formatted user text by processing the user handwritten input, wherein the formatted user text is machine-encoded text. The virtual environment platform may cause the processed user speech to be audibly presented and the formatted user text to be visually presented in the VR environment.

20 Claims, 12 Drawing Sheets

(51) Int. Cl.
*G10L 21/013* (2013.01)
*G10L 13/00* (2006.01)
*G06T 13/40* (2011.01)
*G06T 19/00* (2011.01)
*H04L 9/40* (2022.01)
*G06T 13/20* (2011.01)
*G10L 15/08* (2006.01)

(52) U.S. Cl.
CPC ............ *G06T 19/006* (2013.01); *G10L 13/00* (2013.01); *G10L 15/1815* (2013.01); *G10L 21/013* (2013.01); *H04L 63/0861* (2013.01); *G10L 2015/088* (2013.01); *G10L 2015/223* (2013.01); *G10L 2021/0135* (2013.01)

(56) References Cited

U.S. PATENT DOCUMENTS

| | | | |
|---|---|---|---|
| 2011/0271210 A1 | 11/2011 | Jones et al. | |
| 2011/0271322 A1 | 11/2011 | Adams et al. | |
| 2016/0274662 A1* | 9/2016 | Rimon | G06F 3/16 |
| 2017/0148073 A1 | 5/2017 | Nomula et al. | |
| 2017/0329515 A1* | 11/2017 | Clement | G06F 3/04815 |
| 2019/0287309 A1 | 9/2019 | Samec et al. | |
| 2020/0117898 A1* | 4/2020 | Tian | G06F 3/04815 |

* cited by examiner

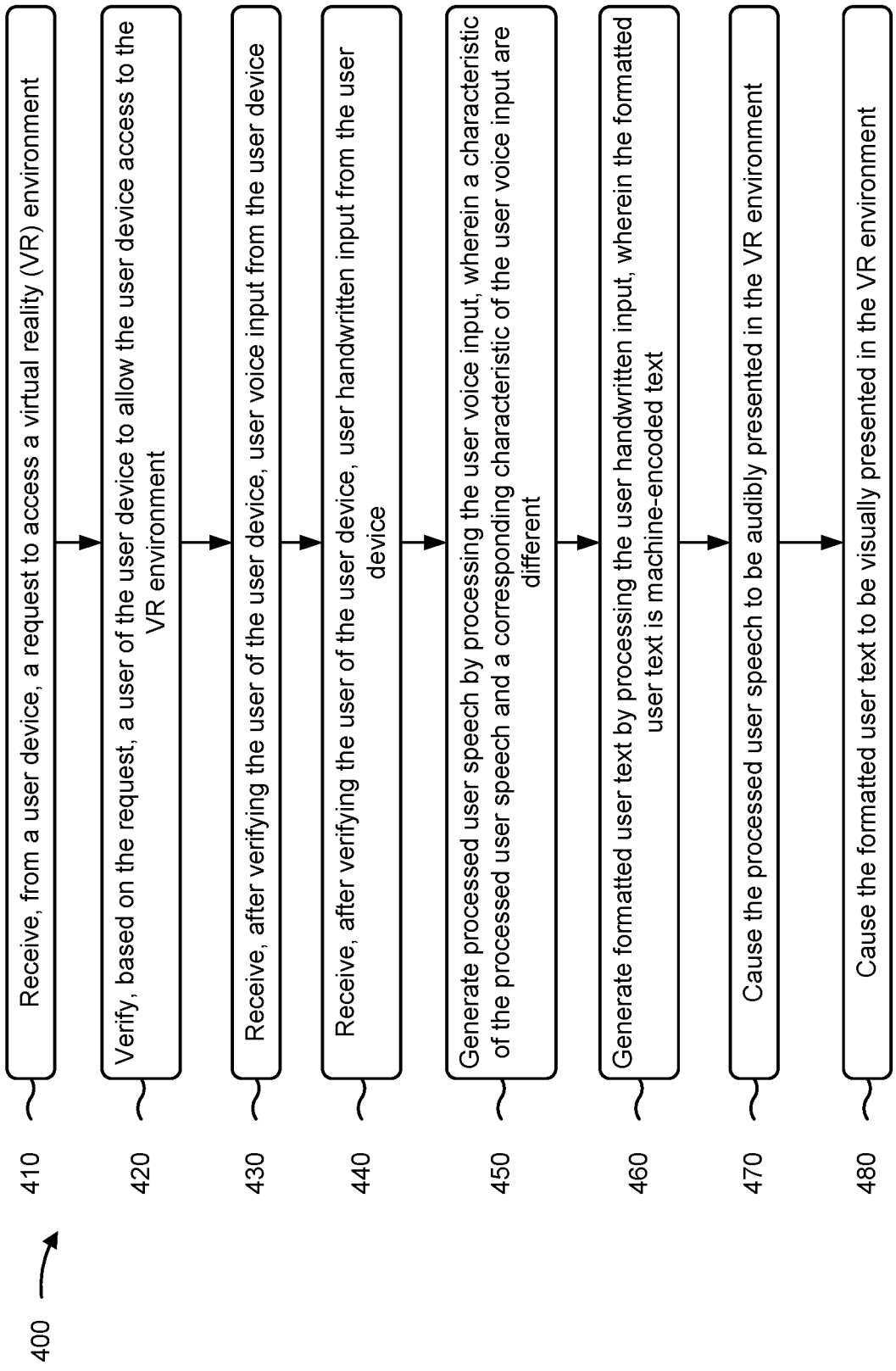

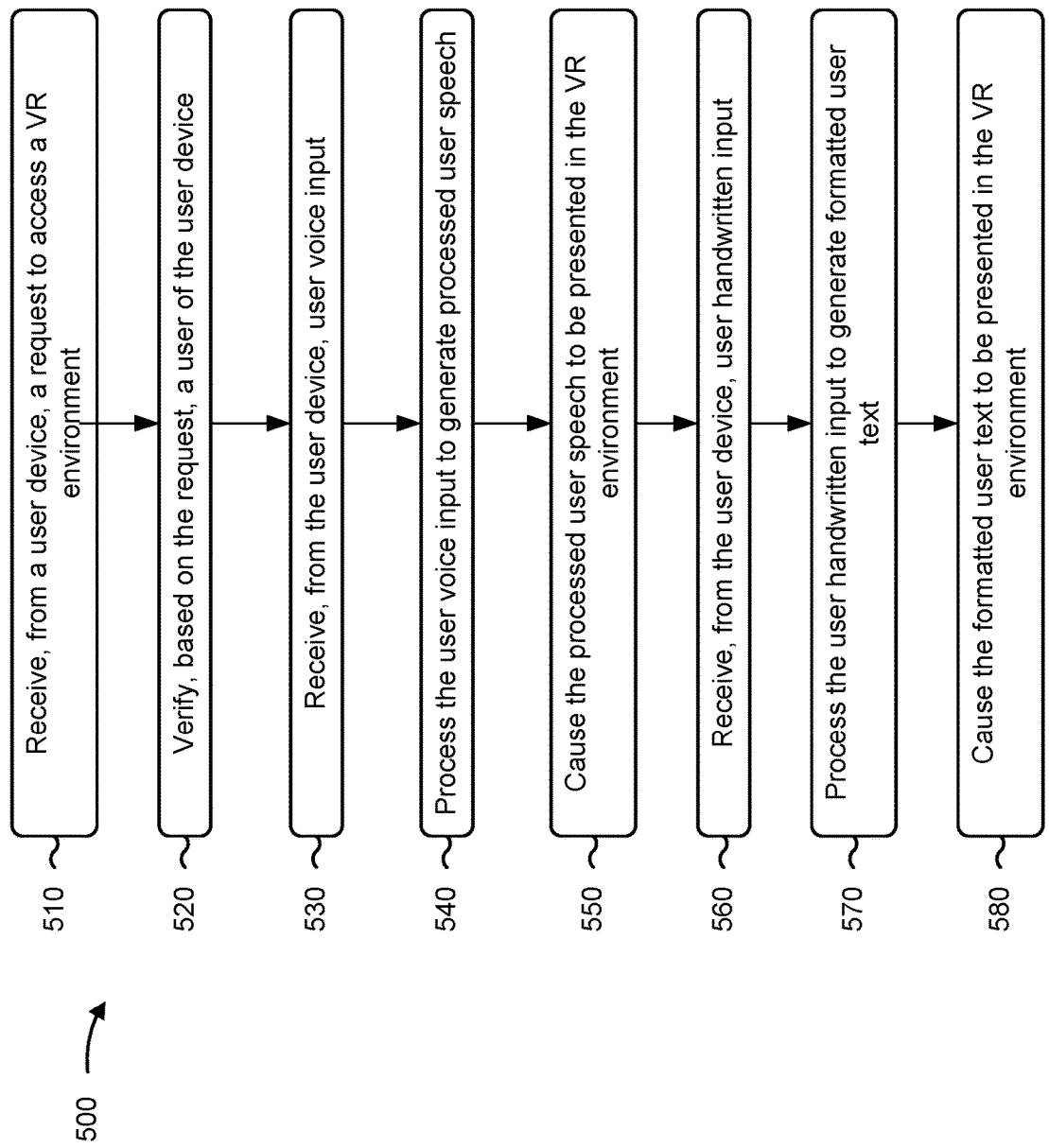

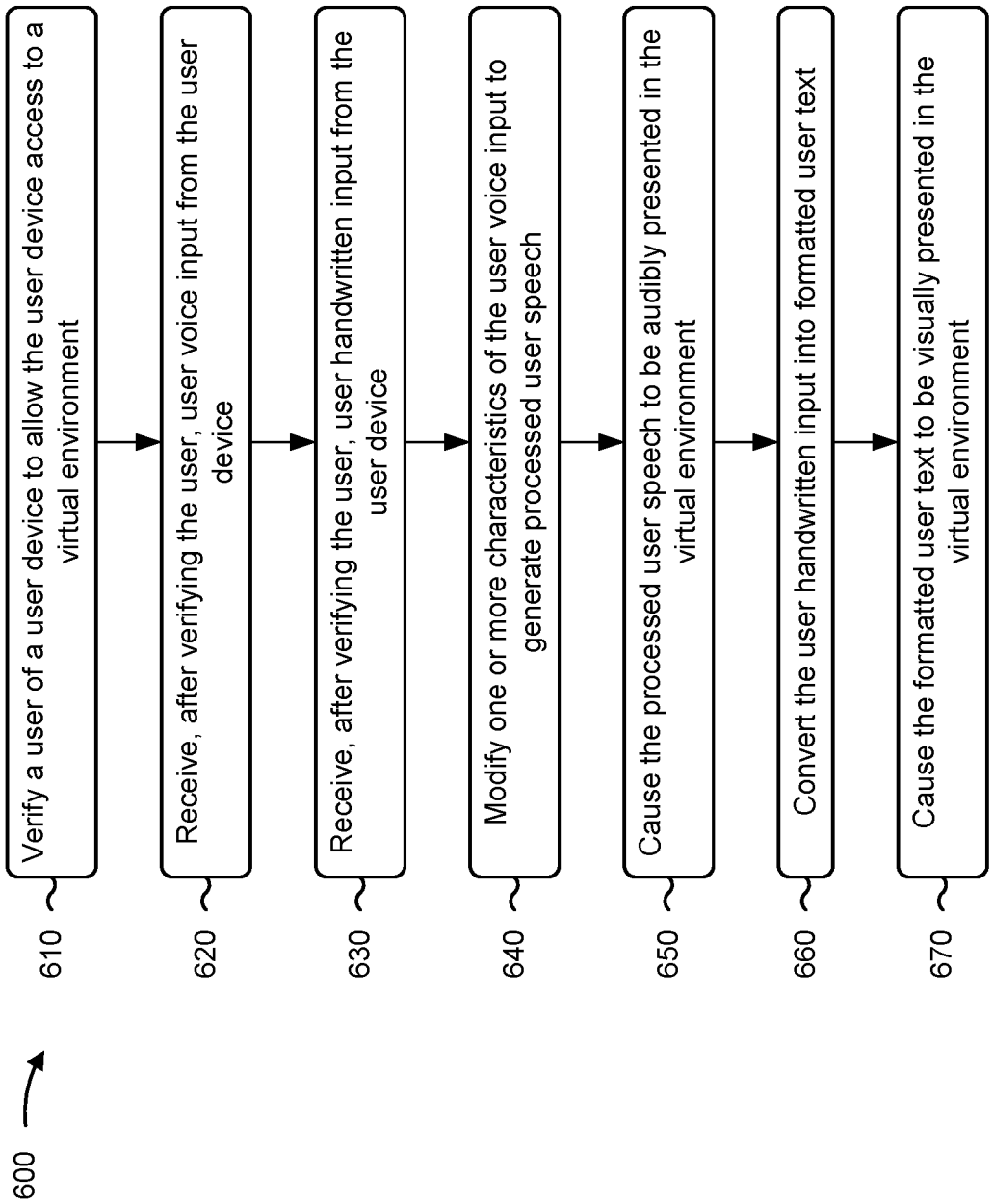

REMOVAL OF IDENTIFYING TRAITS OF A USER IN A VIRTUAL ENVIRONMENT

RELATED APPLICATION

This application is a continuation of U.S. patent application Ser. No. 16/723,546, filed Dec. 20, 2019 (now U.S. Pat. No. 11,043,219), which is incorporated herein by reference in its entirety.

BACKGROUND

Virtual reality (VR) may refer to computer technologies that use software to generate realistic images, sounds, and other sensations that replicate a real environment (or create an imaginary setting), and simulate a user's physical presence in the environment. VR may be defined as a realistic and immersive simulation of a three-dimensional environment, created using interactive software and hardware, and experienced or controlled by movement of a user's body. For example, in a VR environment, a person using special electronic equipment, such as a helmet with a display inside, goggles with a display inside, or the like, may interact with a computer-generated simulation of a three-dimensional image or environment in a seemingly real or physical way.

SUMMARY

According to some implementations, a method may include receiving, by a device and from a user device, a request to access a VR environment; verifying, by the device and based on the request, a user of the user device to allow the user device access to the VR environment; receiving, by the device and after verifying the user of the user device, user voice input from the user device; receiving, by the device and after verifying the user of the user device, user handwritten input from the user device; generating, by the device, processed user speech by processing the user voice input, wherein a characteristic of the processed user speech and a corresponding characteristic of the user voice input are different; generating, by the device, formatted user text by processing the user handwritten input, wherein the formatted user text is machine-encoded text; causing, by the device, the processed user speech to be audibly presented in the VR environment; and causing, by the device, the formatted user text to be visually presented in the VR environment.

According to some implementations, a device may include one or more memories; and one or more processors, communicatively coupled to the one or more memories, configured to: receive, from a user device, a request to access a VR environment; verify, based on the request, a user of the user device; receive, from the user device, user voice input; process the user voice input to generate processed user speech; cause the processed user speech to be presented in the VR environment; receive, from the user device, user handwritten input; process the user handwritten input to generate formatted user text; and cause the formatted user text to be presented in the VR environment.

According to some implementations, a non-transitory computer-readable medium may store one or more instructions. The one or more instructions, when executed by one or more processors of a device, may cause the one or more processors to: verify a user of a user device to allow the user device access to a virtual environment; receive, after verifying the user, user voice input from the user device; receive, after verifying the user, user handwritten input from the user device; modify one or more characteristics of the user voice input to generate processed user speech; cause the processed user speech to be audibly presented in the virtual environment; convert the user handwritten input into formatted user text; and cause the formatted user text to be visually presented in the virtual environment.

BRIEF DESCRIPTION OF THE DRAWINGS

FIGS. 4-6 are flowcharts of example processes for removal of identifying traits of a user in a virtual environment.

DETAILED DESCRIPTION

Figure 1A:
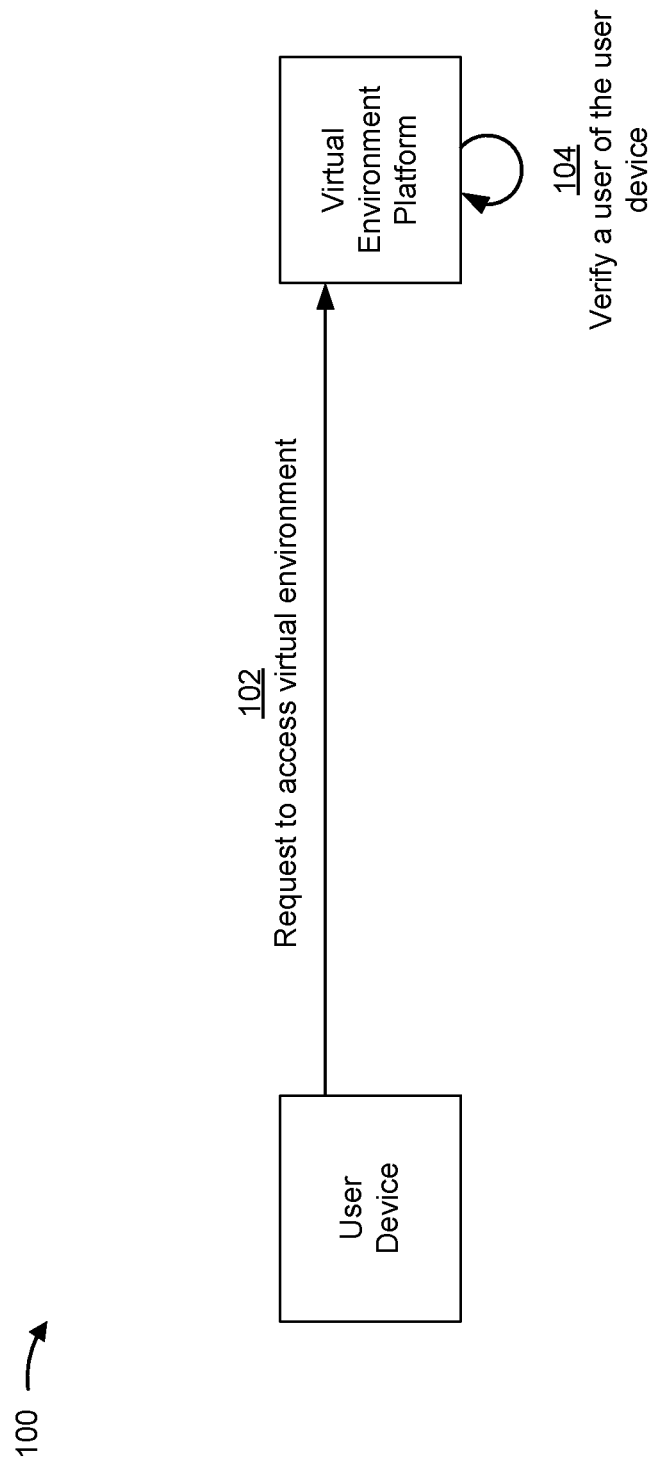
FIGS. 1A-1G are diagrams of one or more example implementations described herein.

The following detailed description of example implementations refers to the accompanying drawings. The same reference numbers in different drawings may identify the same or similar elements.

An interview is a conversation where questions are asked and answers are given, such as a one-on-one conversation between an interviewer and an interviewee. The interviewer asks questions to which the interviewee responds (e.g., by speaking a response or writing a response on a medium, such as a whiteboard), so that information may be transferred from the interviewee to the interviewer. Interviews may occur in person, although modern communications technologies (e.g., videoconferencing, teleconferencing, and/or the like) enable interviews to occur between geographically separate parties (e.g., the interviewee and the interviewer).

Unfortunately, bias may consciously or subconsciously affect an interviewer's perception of an interviewee during an interview. For example, an interviewer may have a conscious or subconscious bias based on a gender, a sex, an age, a race, a sexual orientation, a religion, a physical disability, a mental disability, a national origin or regional origin, and/or the like of the interviewee. In the context of a job interview, this may prevent an interviewer from accurately evaluating an interviewee based on the interviewee's qualifications and/or skill set. This may lead to a qualified interviewee not being offered a job and/or a less than qualified interviewee being offered a job.

In some cases, an organization may have controls in place to try to prevent bias from affecting an evaluation of an interviewee in a job interview. For example, a human resources (HR) representative of the organization may attend a job interview to monitor the job interview for potentially biased questions or conversation. In the case of a videoconference or teleconferencing interview, computing resources (e.g., processing resources, memory resources, networking resources, power resources, and/or the like) of a device, to be used by the HR representative to participate in the job interview to ensure that the job interview is performed without bias, are needed.

Some implementations described herein provide a virtual environment platform that hosts a virtual environment for an interviewer and an interviewee. In some implementations, the virtual environment platform may represent the interviewee as an avatar in the virtual environment. In some implementations, a user device of the interviewee may capture speech of the interviewee and send the speech as user voice input to the virtual environment platform, which may modify one or more characteristics of the user voice input to generate processed user speech. In some implementations, the user device of the interviewee may capture writing of the interviewee and send the writing as user handwritten input to the virtual environment platform, which may modify one or more characteristics of the user handwritten input to generate formatted user text. In some implementations, the virtual environment platform may cause the processed user speech and/or the formatted user text to be presented in the virtual environment to allow the interviewer (e.g., via another user device) to hear the processed user speech and/or see the formatted user text.

In this way, the virtual environment platform facilitates removal of identifying traits of the interviewee in the virtual environment. Accordingly, the interviewer may be less likely to identify a gender, a sex, an age, a race, a sexual orientation, a religion, a physical disability, a mental disability, a national origin or regional origin, and/or the like of the interviewee, which may reduce a likelihood that that interviewer will evaluate the interviewee in a biased manner. Further, the virtual environment platform eliminates a need for an HR representative to monitor the interview, which also eliminates a need to consume computing resources of the device of the HR representative to attend the interview. Moreover, the virtual environment platform may increase a likelihood that a qualified interviewee is hired over a less than qualified interviewee, which may reduce an amount of processing resources needed to hire and terminate a less than qualified interviewee and repeat an interview process to replace the terminated interviewee and/or the like.

FIGS. 1A-1G are diagrams of one or more example implementations 100 described herein. As shown in FIGS. 1A-1G, example implementation(s) 100 may include a user device, an additional user device, and/or a virtual environment platform. In some implementations, the user device, the additional user device, and/or the virtual environment platform may be connected via a network, such as a wired network (e.g., the Internet or another data network), a wireless network (e.g., a wireless local area network, a wireless wide area network, a cellular network, etc.), and/or the like. Some example implementations described herein concern a single user device, a single additional user device, and/or a single virtual environment platform, but implementations can include a plurality of user devices, a plurality of additional user devices, and/or a plurality of virtual environment platforms.

In some implementations, the virtual environment platform may host and/or support a virtual environment, such as a VR environment, an augmented reality (AR) environment, a mixed reality (MR) environment, and/or the like. The virtual environment may be a virtual meeting room where a user of the user device and/or a user of the additional user device may meet to participate in a meeting, an interview, and/or the like.

As shown in FIG. 1A and by reference number 102, the user device may send a request to access the virtual environment to the virtual environment platform. For example, a user of the user device may interact with a user interface of the user device to cause the user device to run a program (e.g., a mobile device application, a desktop computer application, and/or the like) that enables the user to input information (e.g., a command to access the virtual environment) into the user device that causes the user device to generate and send the request to the virtual environment platform.

In some implementations, the request may include one or more authentication credentials of the user of the user device (e.g., a username, a password, an authentication token, and/or the like associated with the user of the user device). As shown by reference number 104, the virtual environment platform may identify the one or more authentication credentials in the request and may determine, based on the one or more authentication credentials, that the user of the user device is authorized to interact with the virtual environment (e.g., the virtual environment platform may verify the user of the user device). For example, the virtual environment platform may communicate with another device, such as a verification server device, to determine that the one or more authentication credentials are accepted and that the user is therefore authorized to interact with the virtual environment. Accordingly, the virtual environment platform may allow the user device to access the virtual environment platform to enable the user to interact with the virtual environment (e.g., via the user device). Additionally, or alternatively, when the virtual environment platform determines that the user is not authorized to interact with the virtual environment, the virtual environment platform may prevent the user device from accessing the virtual environment.

In some implementations, the virtual environment platform may determine a time of the request (e.g., the time when the virtual environment platform received the request) and may determine whether the user device is requesting access to the virtual environment during a period of time in which access to the virtual environment is allowed (e.g., during a scheduled meeting time, a scheduled interview time, and/or the like). When the time of the request is during the period of time, the virtual environment platform may allow the user device to access the virtual environment. Additionally, or alternatively, when the time of request is not during the period of time, the virtual environment platform may prevent the user device from accessing the virtual environment.

Figure 1B:
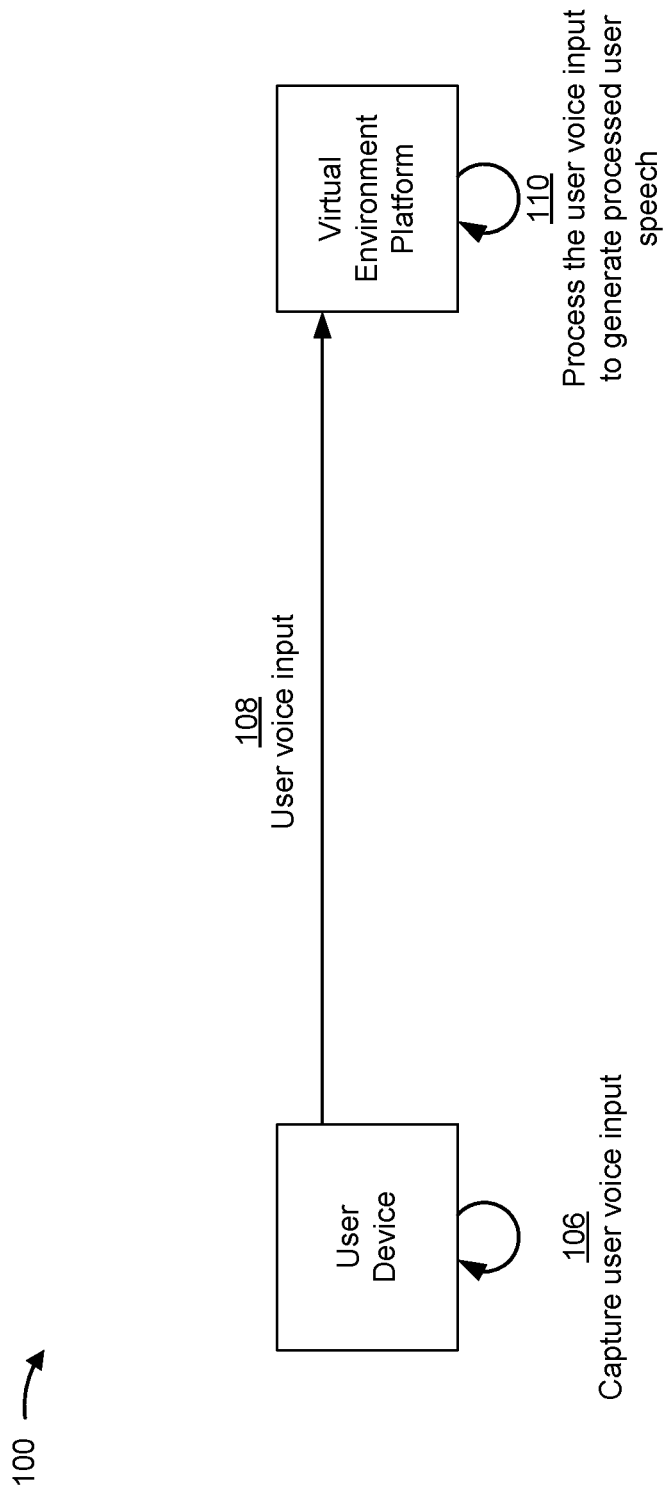

As shown in FIG. 1B and by reference number 106, the user device may capture user voice input of the user of the user device (e.g., after the virtual environment platform allows the user device to access the virtual environment). For example, the user may make an oral statement and a microphone of the user device may capture the oral statement as the user voice input. The user voice input may have one or more characteristics, such as a rate of speech of the user voice input; a cadence of the user voice input; a loudness of the user voice input; a timbre of the user voice input; a language associated with the user voice input; a dialect associated with the user voice input; an accent associated with the user voice input; an articulation associated with the user voice input; a pitch range associated with the user voice input; a grammar associated with the user voice input; and/or the like.

As shown by reference number 108, the user device may send the user voice input to the virtual environment platform. The user device may send the user voice input to the virtual environment platform as an audio file, a media file, and/or the like. In some implementations, the user device may send the voice input in real-time (e.g., as the microphone captures the oral statement) or at one or more intervals (e.g., after the user has finished making the oral statement).

As shown by reference number 110, the virtual environment platform may process the user voice input to generate processed user speech. In some implementations, the virtual environment platform may modify one or more characteristics of the user voice input (e.g., by applying a masking filter to the user voice input) to generate the processed user speech. In this way, the virtual environment platform may ensure that at least one characteristic of the processed user speech and a corresponding at least one characteristic of the user voice input are different.

For example, the virtual environment platform may process the user voice input to modify a pitch range of the user voice input to generate the processed user speech. The processed user speech may be associated with a particular pitch range that is different than the pitch range of the of the user voice input. Other examples include the virtual environment platform processing the voice input to modify a rate of speech of the user voice input, an accent associated with user voice input, an articulation associated with the user voice input, and/or the like to generate the processed user speech.

In an additional example, the virtual environment platform may process the user voice input to determine one or more phrases of the user voice input. The virtual environment platform may determine that at least one phrase is associated with one or more identifying traits of the user (e.g., a gender, a sex, an age, a race, a sexual orientation, a religion, a physical disability, a mental disability, a national origin or regional origin, and/or the like of the user). The virtual environment platform may remove the at least one phrase from the one or more phrases and/or may modify the at least one phrase to generate the processed user speech. In another example, the virtual environment platform may determine that at least one phrase of the one or more phrases of the user voice input is an idiom. The virtual environment platform may determine a literal meaning of the at least one phrase (e.g., by accessing a dictionary, a lookup table, and/or the like) and may replace the at least one phrase with the literal meaning of the at least one phrase to generate the processed user speech.

Additionally, or alternatively, the virtual environment platform may convert the user voice input to text (e.g., by processing the user voice input using a natural language processing technique), may modify the text, and may use a text-to-speech technique to generate the processed user speech. For example, after converting the user voice input to text, the virtual environment platform may determine one or more words of the text and may identify at least one word (e.g., at least one filler word; at least one regional word, such as "ya'll," "pop," or "soda"; and/or the like) associated with the one or more identifying traits of the user. The virtual environment platform may remove the at least one word from the one or more words or modify the at least one word, and may generate the processed user speech using a text-to-speech technique on the one or more words.

Figure 1C:
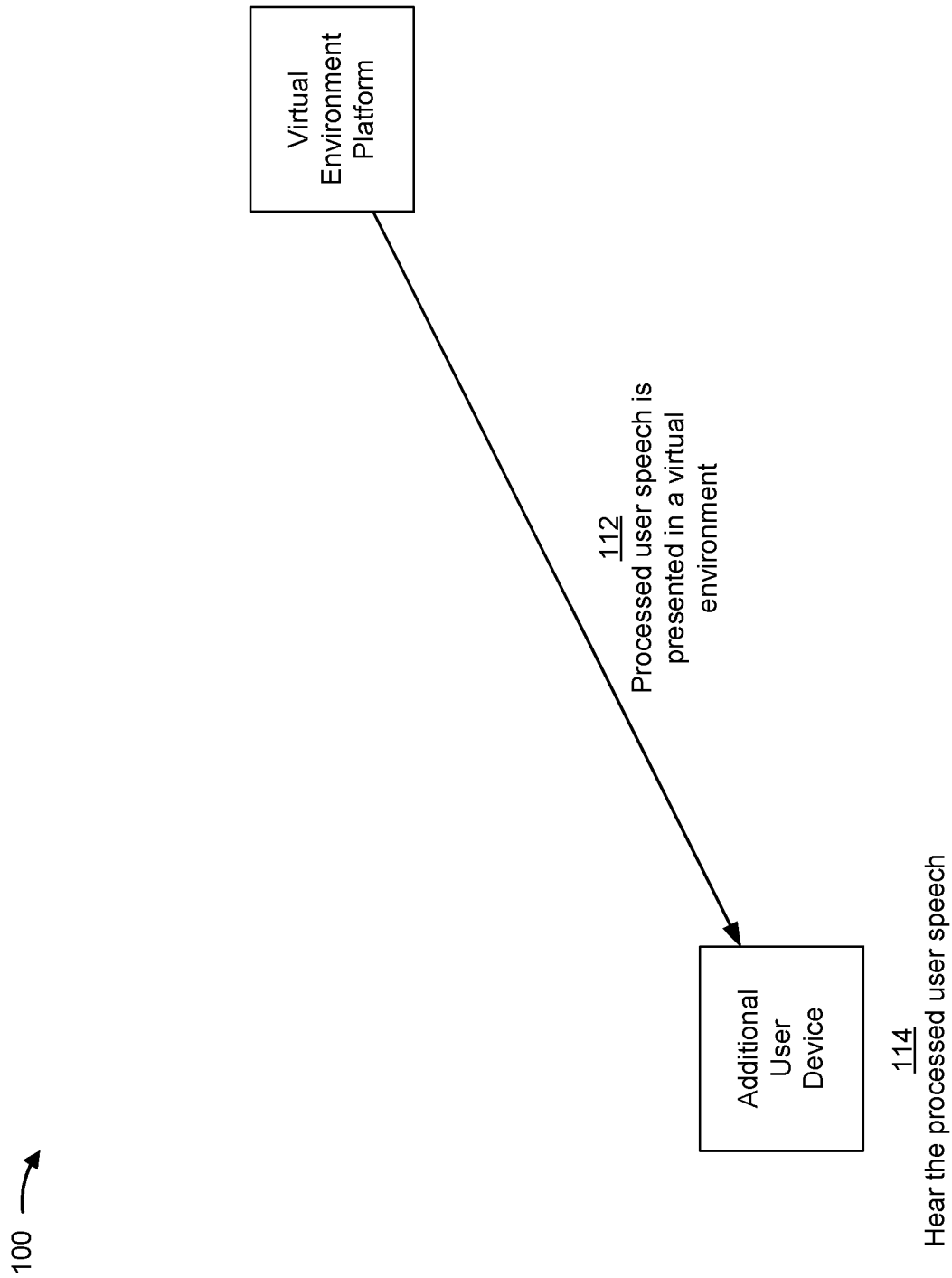

As shown in FIG. 1C and by reference number 112, the virtual environment platform may cause the processed user speech to be presented in the virtual environment. For example, the virtual environment platform may cause the processed user speech to be audibly presented in the virtual environment to allow and/or cause the additional user device to audibly output the processed user speech on a speaker of the additional user device. Additionally, or alternatively, the virtual environment platform may cause an avatar associated with the user of the user device to be depicted as speaking the processed user speech in the virtual environment to allow the additional user device to visually output the avatar speaking the processed user speech on a display of the additional user device. As shown by reference number 114, a user of the additional user device may hear the processed user speech (e.g., via the speaker of the additional user device). Moreover, the user of the additional user device may see the avatar appear to speak the processed user speech (e.g., via the display of the additional user device).

Figure 1D:
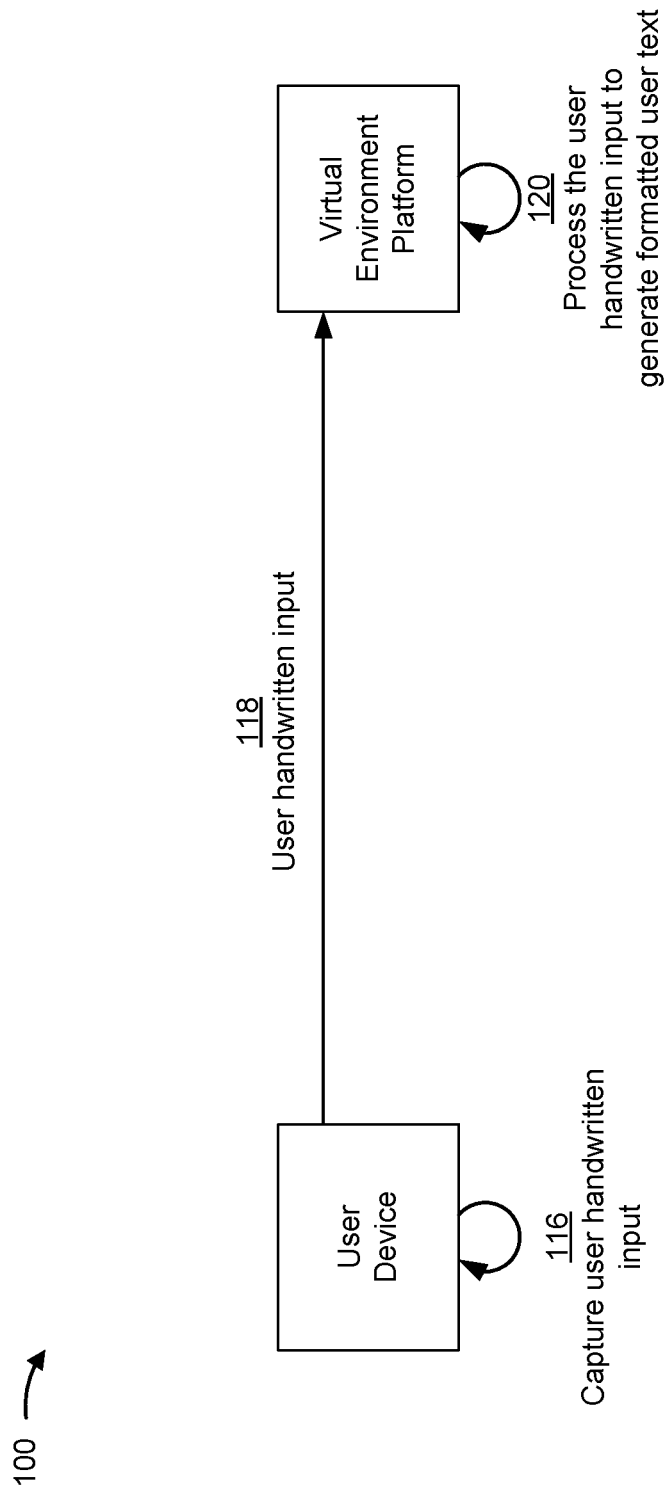

As shown in FIG. 1D and by reference number 116, the user device may capture user handwritten input of the user of the user device (e.g., after the virtual environment platform allows the user device to access the virtual environment). For example, the user may write a character, a word, a symbol, and/or the like on a piece of paper, a whiteboard, and/or the like (e.g., create a writing) and a camera of the user device may capture the writing as the user handwritten input. Additionally, or alternatively, the user may interact with a user interface of the user device (e.g., by writing a character, a word, a symbol and/or the like on the display of the user device using the user's finger, an input device (e.g., a mouse, an electronic pen or pencil, a touch capacitive pad, and/or the like), a VR glove, and/or the like), to enter the user handwritten input directly into the user device. The user handwritten input may have one or more characteristics, such as a shape of specific characters, words, or symbols of the user handwritten input; a spacing between characters, words, or symbols of the user handwritten input; a slope of specific characters or words of the user handwritten input; a size of specific characters, words, or symbols of the user handwritten input; and/or the like.

As shown by reference number 118, the user device may send the user handwritten input to the virtual environment platform. The user device may send the user handwritten input to the virtual environment platform as an image file, a media file, a text file, and/or the like. In some implementations, the user device may send the user handwritten input in real-time (e.g., as the user device captures the user handwritten input) or at one or more intervals (e.g., after the user has finished writing and/or entering the user handwritten input into the user device).

As shown by reference number 120, the virtual environment platform may process the user handwritten input to generate formatted user text. In some implementations, the virtual environment platform may generate the formatted user text by converting the user handwritten input into machine-encoded text. For example, the virtual environment platform may process the user handwritten input to identify one or more handwritten characters; may determine, based on a text generation setting of the virtual environment platform, a particular font; and may generate the formatted user text by converting the one or more handwritten characters into one or more machine-encoded characters in the particular font.

Additionally, or alternatively, the virtual environment platform may determine, based on a text generation setting of the virtual environment platform, a format layout (e.g., a tabbing layout, a spacing layout, an alignment layout, an indenting layout, and/or the like) and may process the user handwritten input to generate the formatted user text according to the format layout. For example, the virtual environment platform may convert the user handwritten input into machine-encoded text, may determine that the user handwritten input is associated with a computer language (e.g., Java, C, python, and/or the like), and may add, based on the computer language, formatting indicators (e.g., tabs, brackets, comment markers, and/or the like) to the machine-encoded text.

Figure 1E:
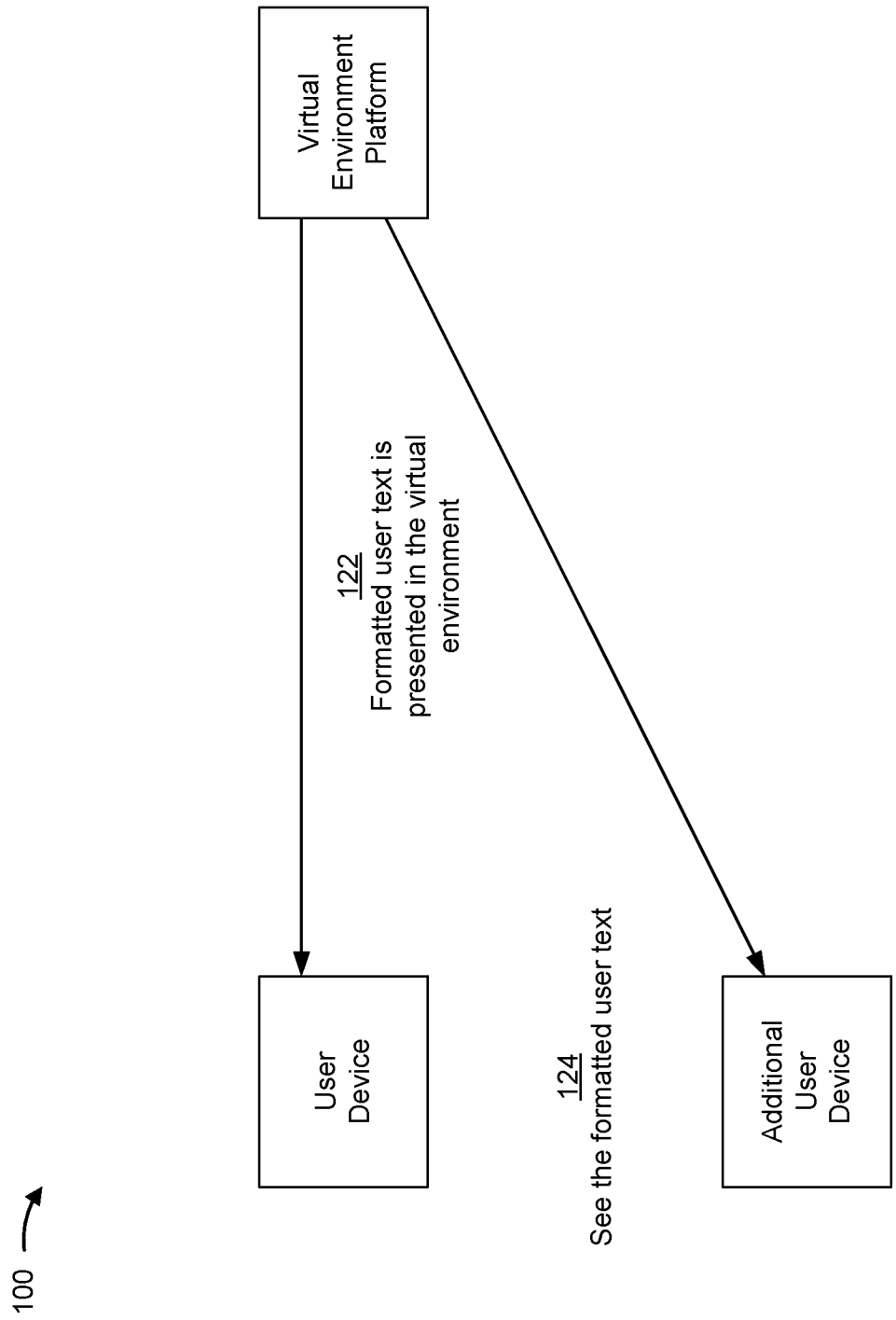
Figure 1F:
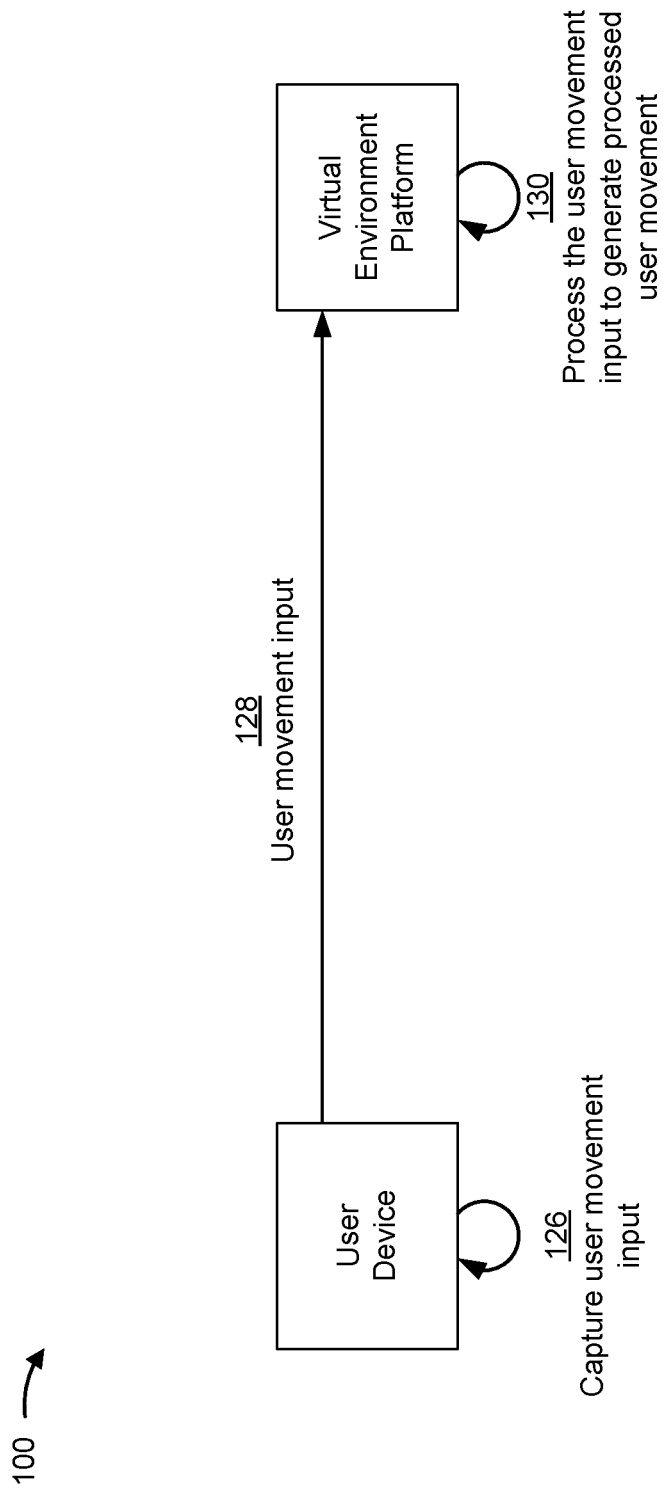

As shown in FIG. 1E and by reference number 122, the virtual environment platform may cause the formatted text to be presented in the virtual environment. For example, the virtual environment platform may cause the formatted user text to be visually presented on a virtual whiteboard, on a virtual document, and/or the like in the virtual environment to allow and/or cause the user device and/or the additional user device to visually present the formatted text on respective displays of the user device and/or the additional user device. Additionally, or alternatively, the virtual environment platform may cause the avatar associated with the user of the user device to be depicted as writing the formatted user text in the virtual environment. This may allow the user device and/or the additional user device to visually output the avatar writing the formatted user text on the respective displays of the user device and/or the additional user device. As shown by reference number 124, the user of the user device (e.g. via the display of the user device) and/or the user of the additional user device (e.g., via the display of the additional user device) may see the formatted user text in the virtual environment. Moreover, the user of the user device and/or the user of the additional user device may see the avatar appear to write the formatted user text As shown in FIG. 1F and by reference number 126, the user device may capture user movement input of the user of the user device (e.g., after the virtual environment platform allows the user device to access the virtual environment). For example, the user may make movements (e.g., shake the user's head, cross the user's arms, point with a user's finger, and/or the like) and an input device of the user device (e.g., a camera, a motion capture device, VR gloves, and/or the like) may capture the movements of the user as the user movement input. The user movement input may have one or more characteristics, such as a speed, an acceleration, a tempo, a direction and/or the like of the user movement input.

As shown by reference number 128, the user device may send the user movement input to the virtual environment platform (e.g., as a movement capture file) in real-time (e.g., as the input device captures the movements of the user) or at one or more intervals (e.g., after the user has finished making one or more movements of the user movements). As shown by reference number 130, the virtual environment platform may process the user movement input to generate processed user movement. For example, the virtual environment platform may process the user movement input to determine one or more movements of the user movement input. The virtual environment platform may determine that at least one movement is associated with the one or more identifying traits of the user. The virtual environment platform may remove the at least one movement from the one or more movements to generate the processed user movement.

Figure 1G:
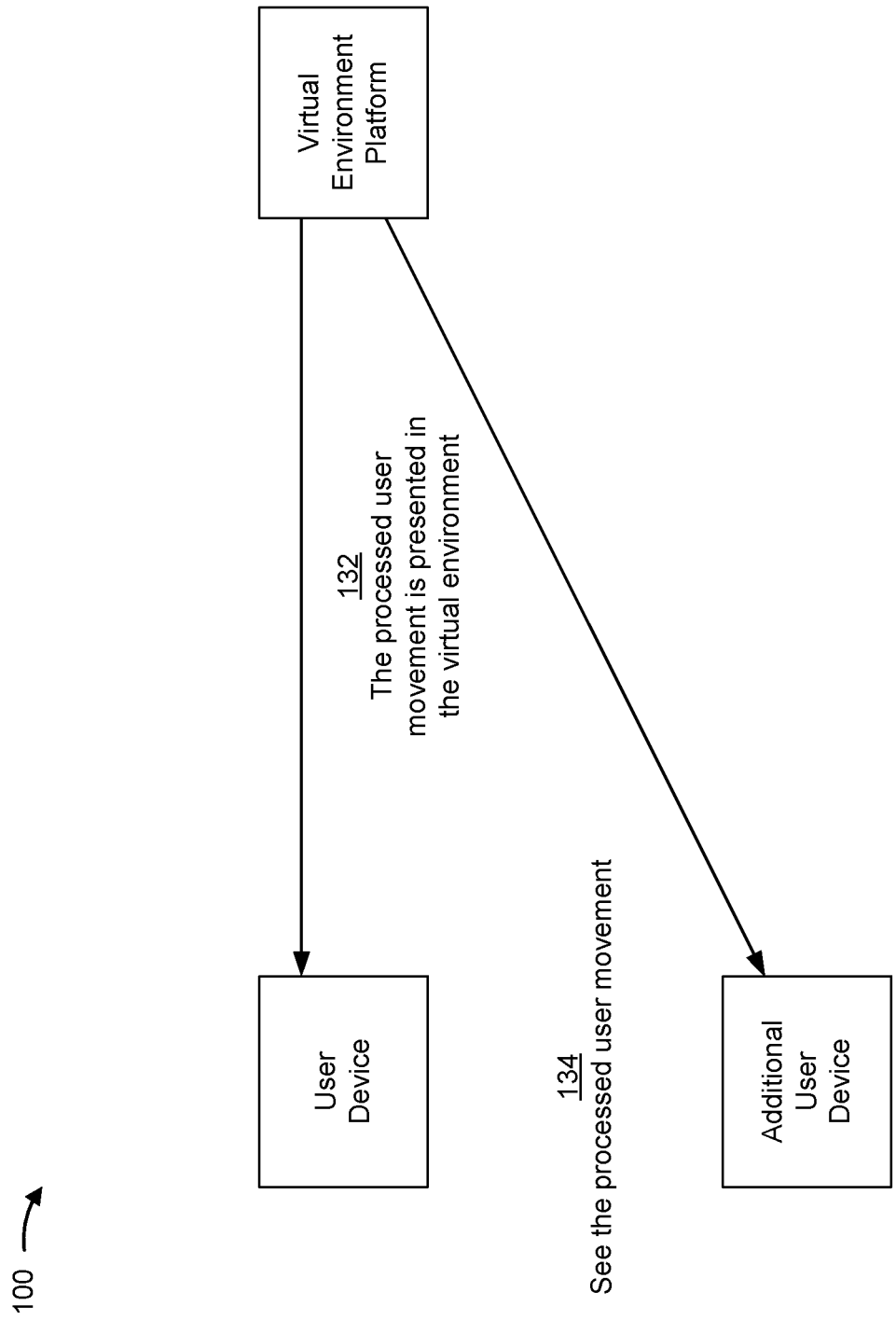

As shown in FIG. 1G and by reference number 132, the virtual environment platform may cause the processed user movement to be presented in the virtual environment. For example, the virtual environment platform may cause the avatar associated with the user of the user device to be depicted as moving according to the processed user movement in the virtual environment to allow the user device and/or the additional user device to visually output the avatar on the respective displays of the user device and/or the additional user device. As shown by reference number 134, the user of the user device (e.g. via the display of the user device) and/or the user of the additional user device (e.g., via the display of the additional user device) may see the avatar moving according to the processed user movement in the virtual environment.

In some implementations, the virtual environment platform may generate the processed user speech, the formatted user text, the processed user movement, and/or the like based on one or more settings (e.g., one or more speech generation settings, one or more text generation settings, one or more movement generation settings, and/or the like). The user of the user device and/or the user of the additional user device may be able to adjust the one or more settings (e.g., via the user device and/or the additional user device communicating with the virtual environment platform) to adjust how the processed user speech, the formatted user text, the processed user movement, and/or the like is generated. For example, the user of the user device and/or the user of the additional user may adjust the one or more settings to modify and/or remove words, phrases, or movements related to legally prohibited topics. As another example, the user of the user device and/or the user of the additional user may adjust the one or more settings to modify and/or remove obscene or objectionable words, phrase, or movements. In some implementations, when the virtual environment platform modifies and/or removes words, phrases, or movements, the virtual environment platform may send feedback to the user device to indicate that the virtual environment platform has modified and/or removed words, phrases, or movements. The user device may display the feedback on the display of the user device so that the user of the user device can learn about the changes.

In some implementations, the virtual environment platform may generate a log relating to the user voice input, the processed user speech, the user handwritten input, the formatted user text, the user movement input, the processed user movement, and/or the like. For example, the virtual environment platform may determine one or more words of the user voice input and may determine one or more settings used by the virtual environment platform to modify the one or more characteristics of the user voice input to generate the processed user speech. The virtual environment platform may generate a log that includes information indicating the one or more words and/or the one or more settings and may send the log to the user device and/or the additional user device. As another example, the virtual environment platform may generate a log that includes the user handwritten input, a text generation setting used by the virtual environment platform to determine a format layout, and the formatted user text that conforms to the format layout. The virtual environment platform may send the log to the user device and/or the additional user device.

As indicated above, FIGS. 1A-1G are provided merely as an example. Other examples are possible and may differ from what was described with regard to FIGS. 1A-1G.

Figure 2:
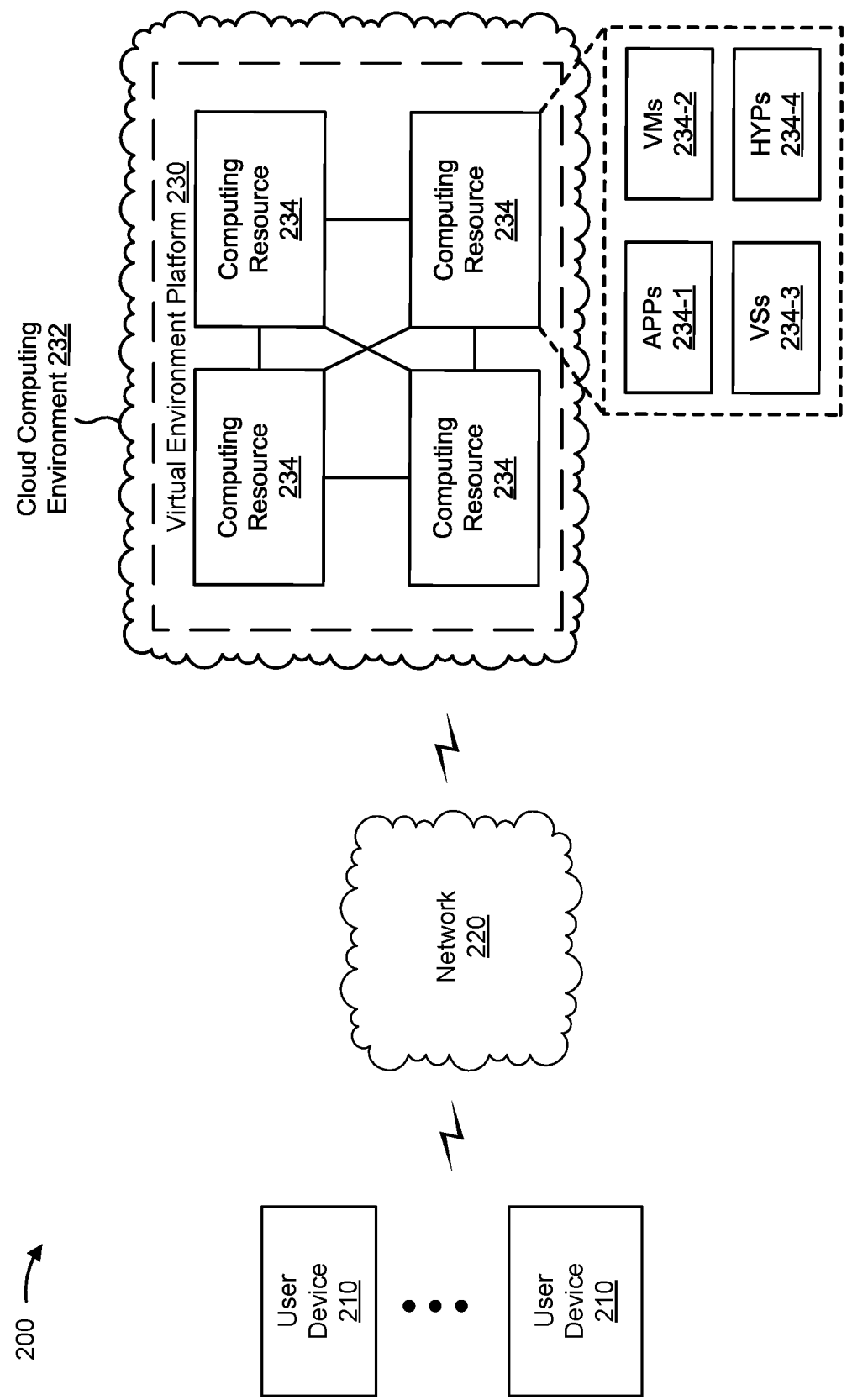
FIG. 2 is a diagram of an example environment in which systems and/or methods described herein may be implemented.

FIG. 2 is a diagram of an example environment in which systems and/or methods, described herein, may be implemented. As shown in FIG. 2, environment 200 may include one or more user device(s) 210, a network 220, and/or a virtual environment platform 230 hosted in a cloud computing environment 232. Devices of environment 200 may interconnect via wired connections, wireless connections, or a combination of wired and wireless connections.

User device 210 includes one or more devices capable of receiving, generating, storing, processing, and/or providing information associated with a virtual environment. For example, user device 210 may include a communication and computing device, such as a mobile phone (e.g., a smart phone, a radiotelephone, etc.), a laptop computer, a tablet computer, a handheld computer, a wearable communication device (e.g., a virtual reality headset, a pair of smart eyeglasses, etc.), a virtual reality device, and/or the like. In some implementations, user device 210 may receive information from and/or transmit information to virtual environment platform 230 via network 220.

Network 220 includes one or more wired and/or wireless networks. For example, network 220 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the internet, a fiber optic-based network, a cloud computing network, a mesh network and/or the like, and/or a combination of these or other types of networks.

Virtual environment platform 230 includes one or more devices capable of receiving, determining, processing, storing, and/or providing information associated with a virtual environment. In some implementations, virtual environment platform 230 may be designed to be modular such that certain software components may be swapped in or out depending on a particular need. As such, virtual environment platform 230 may be easily and/or quickly reconfigured for different uses. In some implementations, virtual environment platform 230 may receive information from and/or transmit information to user device 210 via network 220.

In some implementations, as shown, virtual environment platform 230 may be hosted in a cloud computing environment 232. Notably, while implementations described herein describe virtual environment platform 230 as being hosted in cloud computing environment 232, in some implementations, virtual environment platform 230 may be non-cloud-based (i.e., may be implemented outside of a cloud computing environment) or may be partially cloud-based.

Cloud computing environment 232 includes an environment that hosts virtual environment platform 230. Cloud computing environment 232 may provide computation, software, data access, storage, etc. services that do not require end-user knowledge of a physical location and configuration of system(s) and/or device(s) that hosts virtual environment platform 230. As shown, cloud computing environment 232 may include a group of computing resources 234 (referred to collectively as "computing resources 234" and individually as "computing resource 234").

Computing resource 234 includes one or more personal computers, workstation computers, server devices, or other types of computation and/or communication devices. In some implementations, computing resource 234 may host virtual environment platform 230. The cloud resources may include compute instances executing in computing resource 234, storage devices provided in computing resource 234, data transfer devices provided by computing resource 234, etc. In some implementations, computing resource 234 may communicate with other computing resources 234 via wired connections, wireless connections, or a combination of wired and wireless connections.

As further shown in FIG. 2, computing resource 234 includes a group of cloud resources, such as one or more applications ("APPs") 234-1, one or more virtual machines ("VMs") 234-2, virtualized storage ("VSs") 234-3, one or more hypervisors ("HYPs") 234-4, and/or the like.

Application 234-1 includes one or more software applications that may be provided to or accessed by user device 210. Application 234-1 may eliminate a need to install and execute the software applications on user device 210. For example, application 234-1 may include software associated with virtual environment platform 230 and/or any other software capable of being provided via cloud computing environment 232. In some implementations, one application 234-1 may send/receive information to/from one or more other applications 234-1, via virtual machine 234-2.

Virtual machine 234-2 includes a software implementation of a machine (e.g., a computer) that executes programs like a physical machine. Virtual machine 234-2 may be either a system virtual machine or a process virtual machine, depending upon use and degree of correspondence to any real machine by virtual machine 234-2. A system virtual machine may provide a complete system platform that supports execution of a complete operating system ("OS"). A process virtual machine may execute a single program, and may support a single process. In some implementations, virtual machine 234-2 may execute on behalf of a user (e.g., a user of user device 210), and may manage infrastructure of cloud computing environment 232, such as data management, synchronization, or long-duration data transfers.

Virtualized storage 234-3 includes one or more storage systems and/or one or more devices that use virtualization techniques within the storage systems or devices of computing resource 234. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 234-4 may provide hardware virtualization techniques that allow multiple operating systems (e.g., "guest operating systems") to execute concurrently on a host computer, such as computing resource 234. Hypervisor 234-4 may present a virtual operating platform to the guest operating systems, and may manage the execution of the guest operating systems. Multiple instances of a variety of operating systems may share virtualized hardware resources.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
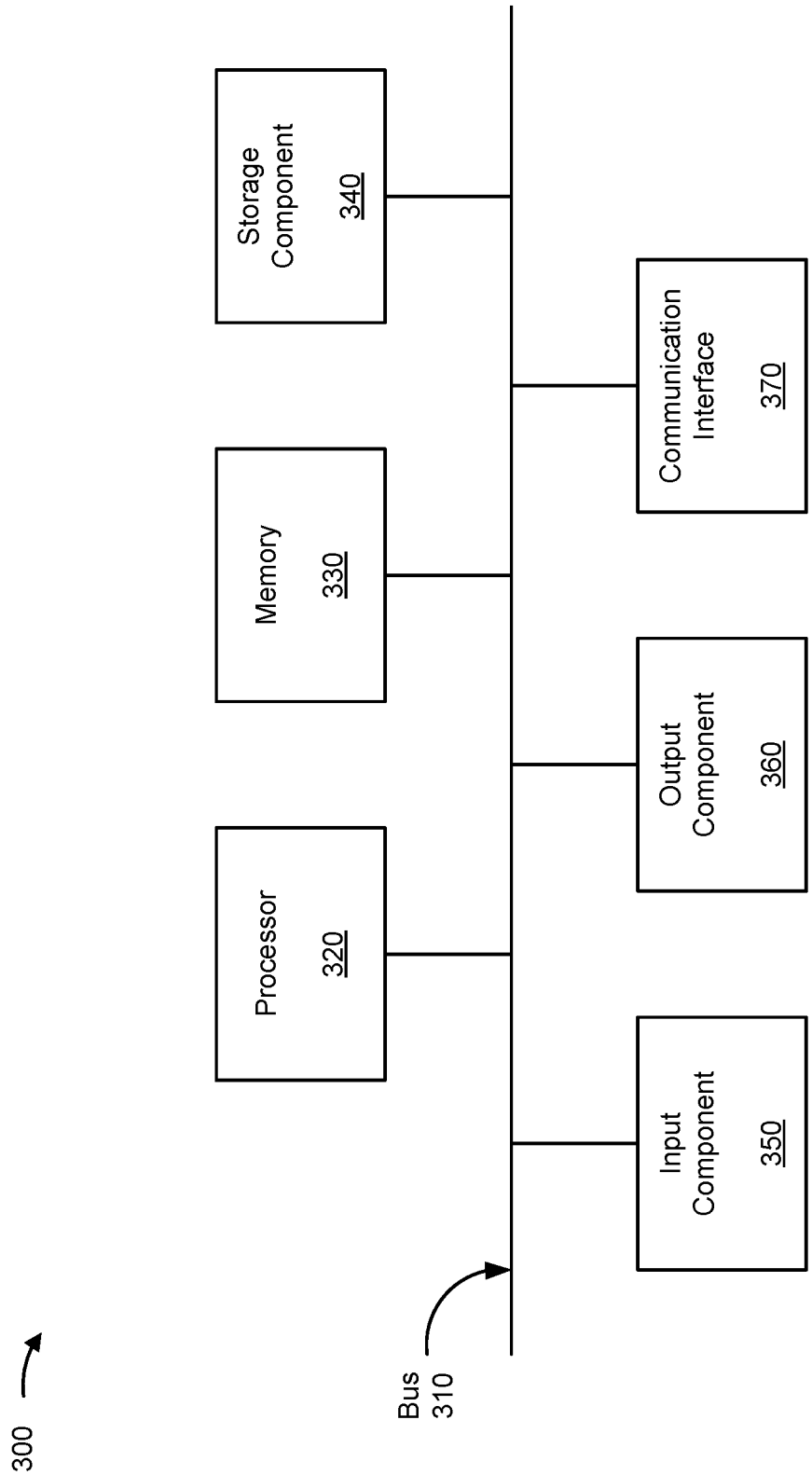
FIG. 3 is a diagram of example components of one or more devices of FIG. 2.

FIG. 3 is a diagram of example components of a device 300. Device 300 may correspond to user device 210, virtual environment platform 230, computing resource 234, and/or the like. In some implementations, user device 210, virtual environment platform 230, computing resource 234, and/or the like may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among multiple components of device 300. Processor 320 is implemented in hardware, firmware, and/or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flowchart of an example process 400 for removal of identifying traits of a user in a virtual environment. In some implementations, one or more process blocks of FIG. 4 may be performed by a virtual environment platform (e.g., virtual environment platform 230). In some implementations, one or more process blocks of FIG. 4 may be performed by another device or a group of devices separate from or including the virtual environment platform, such as a user device (e.g., user device 210), and/or the like.

As shown in FIG. 4, process 400 may include receiving, from a user device, a request to access a VR environment (block 410). For example, the virtual environment platform (e.g., using computing resource 234, processor 320, memory 330, storage component 340, input component 350, output component 360, communication interface 370 and/or the like) may receive, from a user device, a request to access a VR environment, as described above.

As further shown in FIG. 4, process 400 may include verifying, based on the request, a user of the user device to allow the user device access to the VR environment (block 420). For example, the virtual environment platform (e.g., using computing resource 234, processor 320, memory 330, storage component 340, input component 350, output component 360, communication interface 370 and/or the like) may verify, based on the request, a user of the user device to allow the user device access to the VR environment, as described above.

As further shown in FIG. 4, process 400 may include receiving, after verifying the user of the user device, user voice input from the user device (block 430). For example, the virtual environment platform (e.g., using computing resource 234, processor 320, memory 330, storage component 340, input component 350, output component 360, communication interface 370 and/or the like) may receive, after verifying the user of the user device, user voice input from the user device, as described above.

As further shown in FIG. 4, process 400 may include receiving, after verifying the user of the user device, user handwritten input from the user device (block 440). For example, the virtual environment platform (e.g., using computing resource 234, processor 320, memory 330, storage component 340, input component 350, output component 360, communication interface 370 and/or the like) may receive, after verifying the user of the user device, user handwritten input from the user device, as described above.

As further shown in FIG. 4, process 400 may include generating processed user speech by processing the user voice input, wherein a characteristic of the processed user speech and a corresponding characteristic of the user voice input are different (block 450). For example, the virtual environment platform (e.g., using computing resource 234, processor 320, memory 330, storage component 340, input component 350, output component 360, communication interface 370 and/or the like) may generate processed user speech by processing the user voice input, as described above. In some implementations, a characteristic of the processed user speech and a corresponding characteristic of the user voice input are different.

As further shown in FIG. 4, process 400 may include generating formatted user text by processing the user handwritten input, wherein the formatted user text is machine-encoded text (block 460). For example, the virtual environment platform (e.g., using computing resource 234, processor 320, memory 330, storage component 340, input component 350, output component 360, communication interface 370 and/or the like) may generate formatted user text by processing the user handwritten input, as described above. In some implementations, the formatted user text is machine-encoded text.

As further shown in FIG. 4, process 400 may include causing the processed user speech to be audibly presented in the VR environment (block 470). For example, the virtual environment platform (e.g., using computing resource 234, processor 320, memory 330, storage component 340, input component 350, output component 360, communication interface 370 and/or the like) may cause the processed user speech to be audibly presented in the VR environment, as described above.

As further shown in FIG. 4, process 400 may include causing the formatted user text to be visually presented in the VR environment (block 480). For example, the virtual environment platform (e.g., using computing resource 234, processor 320, memory 330, storage component 340, input component 350, output component 360, communication interface 370 and/or the like) may cause the formatted user text to be visually presented in the VR environment, as described above.

Process 400 may include additional implementations, such as any single implementation or any combination of implementations described below and/or in connection with one or more other processes described elsewhere herein.

In a first implementation, verifying the user of the user device to allow the user device access to the VR environment comprises identifying one or more authentication credentials in the request; determining, based on the one or more authentication credentials, that the user of the user device is authorized to interact with the VR environment, and determining, based on a time of the request, that the user device is requesting access to the VR environment during a period of time in which access to the VR environment is allowed.

In a second implementation, alone or in combination with the first implementation, generating the processed user speech by processing the user voice input comprises processing the user voice input using a natural language processing technique to convert the user voice input to text; determining one or more words of the text; identifying at least one filler word in the one or more words of the text; removing the at least one filler word from the one or more words of the text to modify the one or more words of the text, and generating, based on the modified one or more words of the text, the processed user speech using a text-to-speech technique.

In a third implementation, alone or in combination with one or more of the first and second implementations, generating the processed user speech by processing the user voice input comprises generating the processed user speech by applying a masking filter to the user voice input to change one or more characteristics of the user voice input.

In a fourth implementation, alone or in combination with one or more of the first through third implementations, the one or more characteristics of the user voice input comprises at least one of a rate of speech of the user voice input; a cadence of the user voice input; a loudness of the user voice input; a timbre of the user voice input; a language associated with the user voice input; a dialect associated with the user voice input; an accent associated with the user voice input; an articulation associated with the user voice input; a pitch range associated with the user voice input; or a grammar associated with the user voice input.

In a fifth implementation, alone or in combination with one or more of the first through fourth implementations, generating the formatted user text by processing the user handwritten input comprises converting the user handwritten input into machine-encoded text; determining that the user handwritten input is associated with a computer language, and adding, based on the computer language, formatting indicators to the machine-encoded text.

In a sixth implementation, alone or in combination with one or more of the first through fifth implementations, causing the processed user speech to be audibly presented in the VR environment comprises causing the processed user speech to be presented in the VR environment to allow an additional user device to audibly output the processed user speech on a speaker of the additional user device and causing an avatar associated with the user of the user device to be depicted as speaking the processed user speech in the VR environment to allow the additional user device to visually output the avatar on a display of the additional user device.

In a seventh implementation, alone or in combination with one or more of the first through sixth implementations, causing the formatted user text to be visually presented in the VR environment comprises causing the formatted user text to be visually presented on a virtual whiteboard in the VR environment.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIG. 5 is a flowchart of an example process 500 for removal of identifying traits of a user in a virtual environment. In some implementations, one or more process blocks of FIG. 5 may be performed by a virtual environment platform (e.g., virtual environment platform 230). In some implementations, one or more process blocks of FIG. 5 may be performed by another device or a group of devices separate from or including the virtual environment platform, such as a user device (e.g., user device 210), and/or the like.

As shown in FIG. 5, process 500 may include receiving, from a user device, a request to access a virtual reality (VR) environment (block 510). For example, the virtual environment platform (e.g., using computing resource 234, processor 320, memory 330, storage component 340, input component 350, output component 360, communication interface 370 and/or the like) may receive, from a user device, a request to access a virtual reality (VR) environment, as described above.

As further shown in FIG. 5, process 500 may include verifying, based on the request, a user of the user device (block 520). For example, the virtual environment platform (e.g., using computing resource 234, processor 320, memory 330, storage component 340, input component 350, output component 360, communication interface 370 and/or the like) may verify, based on the request, a user of the user device, as described above.

As further shown in FIG. 5, process 500 may include receiving, from the user device, user voice input (block 530). For example, the virtual environment platform (e.g., using computing resource 234, processor 320, memory 330, storage component 340, input component 350, output component 360, communication interface 370 and/or the like) may receive, from the user device, user voice input, as described above.

As further shown in FIG. 5, process 500 may include processing the user voice input to generate processed user speech (block 540). For example, the virtual environment platform (e.g., using computing resource 234, processor 320, memory 330, storage component 340, input component 350, output component 360, communication interface 370 and/or the like) may process the user voice input to generate processed user speech, as described above.

As further shown in FIG. 5, process 500 may include causing the processed user speech to be presented in the VR environment (block 550). For example, the virtual environment platform (e.g., using computing resource 234, processor 320, memory 330, storage component 340, input component 350, output component 360, communication interface 370 and/or the like) may cause the processed user speech to be presented in the VR environment, as described above.

As further shown in FIG. 5, process 500 may include receiving, from the user device, user handwritten input (block 560). For example, the virtual environment platform (e.g., using computing resource 234, processor 320, memory 330, storage component 340, input component 350, output component 360, communication interface 370 and/or the like) may receive, from the user device, user handwritten input, as described above.

As further shown in FIG. 5, process 500 may include processing the user handwritten input to generate formatted user text (block 570). For example, the virtual environment platform (e.g., using computing resource 234, processor 320, memory 330, storage component 340, input component 350, output component 360, communication interface 370 and/or the like) may process the user handwritten input to generate formatted user text, as described above.

As further shown in FIG. 5, process 500 may include causing the formatted user text to be presented in the VR environment (block 580). For example, the virtual environment platform (e.g., using computing resource 234, processor 320, memory 330, storage component 340, input component 350, output component 360, communication interface 370 and/or the like) may cause the formatted user text to be presented in the VR environment, as described above.

Process 500 may include additional implementations, such as any single implementation or any combination of implementations described below and/or in connection with one or more other processes described elsewhere herein.

In a first implementation, processing the user voice input to generate the processed user speech comprises processing the user voice input to determine one or more phrases of the user voice input; determining that a phrase, of the one or more phrases of the user voice input, is an idiom; determining a literal meaning of the phrase; updating the one or more phrases of the user voice input to replace the phrase with the literal meaning of the phrase; and generating, based on the updated one or more phrases of the user voice input, the processed user speech.

In a second implementation, alone or in combination with the first implementation, processing the user handwritten input to generate formatted user text comprises processing the user handwritten input to identify one or more handwritten characters; identifying a particular font; and generating the formatted user text by converting the one or more handwritten characters into one or more machine-encoded characters in the particular font.

In a third implementation, alone or in combination with one or more of the first and second implementations, the virtual environment platform may further obtain, from the user device, user movement input and cause an avatar associated with the user of the user device to be depicted as moving according to the user movement input in the VR environment.

In a fourth implementation, alone or in combination with one or more of the first through third implementations, processing the user voice input to generate the processed user speech comprises processing the user voice input to modify a pitch range of the user voice input to generate the processed user speech within a particular pitch range that is different than the pitch range of the of the user voice input.

In a fifth implementation, alone or in combination with one or more of the first through fourth implementations, processing the user handwritten input to generate the formatted user text comprises determining, based on a user text configuration setting, a format layout and processing the user handwritten input to generate the formatted user text according to the format layout.

In a sixth implementation, alone or in combination with one or more of the first through fifth implementations, processing the user voice input to generate the processed user speech comprises processing the user voice input to determine one or more phrases of the user voice input; determining that at least one phrase, of the one or more phrases, indicates one or more traits associated with the user; updating the one or more phrases to remove the at least one phrase; and generating the processed user speech based on the updated one or more phrases.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a flowchart of an example process 600 for removal of identifying traits of a user in a virtual environment. In some implementations, one or more process blocks of FIG. 6 may be performed by a virtual environment platform (e.g., virtual environment platform 230). In some implementations, one or more process blocks of FIG. 6 may be performed by another device or a group of devices separate from or including the virtual environment platform, such as a user device (e.g., user device 210), and/or the like.

As shown in FIG. 6, process 600 may include verifying a user of a user device to allow the user device access to a virtual environment (block 610). For example, the virtual environment platform (e.g., using computing resource 234, processor 320, memory 330, storage component 340, input component 350, output component 360, communication interface 370 and/or the like) may verify a user of a user device to allow the user device access to a virtual environment, as described above.

As further shown in FIG. 6, process 600 may include receiving, after verifying the user, user voice input from the user device (block 620). For example, the virtual environment platform (e.g., using computing resource 234, processor 320, memory 330, storage component 340, input component 350, output component 360, communication interface 370 and/or the like) may receive, after verifying the user, user voice input from the user device, as described above.

As further shown in FIG. 6, process 600 may include receiving, after verifying the user, user handwritten input from the user device (block 630). For example, the virtual environment platform (e.g., using computing resource 234, processor 320, memory 330, storage component 340, input component 350, output component 360, communication interface 370 and/or the like) may receive, after verifying the user, user handwritten input from the user device, as described above.

As further shown in FIG. 6, process 600 may include modifying one or more characteristics of the user voice input to generate processed user speech (block 640). For example, the virtual environment platform (e.g., using computing resource 234, processor 320, memory 330, storage component 340, input component 350, output component 360, communication interface 370 and/or the like) may modify one or more characteristics of the user voice input to generate processed user speech, as described above.

As further shown in FIG. 6, process 600 may include causing the processed user speech to be audibly presented in the virtual environment (block 650). For example, the virtual environment platform (e.g., using computing resource 234, processor 320, memory 330, storage component 340, input component 350, output component 360, communication interface 370 and/or the like) may cause the processed user speech to be audibly presented in the virtual environment, as described above.

As further shown in FIG. 6, process 600 may include converting the user handwritten input into formatted user text (block 660). For example, the virtual environment platform (e.g., using computing resource 234, processor 320, memory 330, storage component 340, input component 350, output component 360, communication interface 370 and/or the like) may convert the user handwritten input into formatted user text, as described above.

As further shown in FIG. 6, process 600 may include causing the formatted user text to be visually presented in the virtual environment (block 670). For example, the virtual environment platform (e.g., using computing resource 234, processor 320, memory 330, storage component 340, input component 350, output component 360, communication interface 370 and/or the like) may cause the formatted user text to be visually presented in the virtual environment, as described above.

Process 600 may include additional implementations, such as any single implementation or any combination of implementations described below and/or in connection with one or more other processes described elsewhere herein.

In a first implementation, the virtual environment is a virtual reality (VR) environment, an augmented reality (AR) environment, or a mixed reality (MR) environment.

In a second implementation, alone or in combination with the first implementation, modifying the one or more characteristics of the user voice input to generate the processed user speech comprises modifying at least one of a rate of speech of the user voice input; a cadence of the user voice input; a loudness of the user voice input; a timbre of the user voice input; a language associated with the user voice input; a dialect associated with the user voice input; an accent associated with the user voice input; an articulation associated with the user voice input; a pitch range associated with the user voice input; or a grammar associated with the user voice input.

In a third implementation, alone or in combination with one or more of the first and second implementations, causing the formatted user text to be visually presented in the virtual environment comprises causing the formatted user text to be visually presented on a virtual document of the virtual environment.

In a fourth implementation, alone or in combination with one or more of the first through third implementations, the virtual environment platform may further determine one or more words of the user voice input; determine one or more settings used by the device to modify the one or more characteristics of the user voice input to generate the processed user speech; generate a log that includes information indicating the one or more words and the one or more settings; and send the log to a different device.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Certain user interfaces have been described herein. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   receiving, by a device, user voice input from a user device in a first virtual reality (VR) environment;
   receiving, by the device, user handwritten input from the user device in the first VR environment,
      wherein the user handwritten input is received based on an interaction with a computer-generated simulation of a three-dimensional environment to create a writing,
         wherein the user handwritten input is generated based on a user interaction with a user interface to simulate writing out a character, a word, or symbol, and
      wherein the user handwritten input is based on receiving at least one of the character, the word, or the symbol;
   generating, by the device, processed user speech by processing the user voice input;
   generating, by the device, formatted user text by processing the user handwritten input,
      wherein the formatted user text is generated by converting the at least one of the character, the word, or the symbol into one or more machine-encoded characters;
   causing, by the device, the formatted user text to be visually presented in a second VR environment; and
   causing, by the device, the processed user speech to be audibly presented in the second VR environment.

2. The method of claim 1, wherein the user voice input is received in real-time.

3. The method of claim 1, further comprising:
   obtaining, from the user device, user movement input,
      wherein the user movement input comprises one or more user movements;
   determining that the user movement input is associated with one or more identifying traits;
   processing the user movement input to remove at least one user movement, of the one or more user movements, based on the one or more identifying traits; and
   causing an avatar associated with a user to be depicted as moving based on the processed user movement input.

4. The method of claim 1, wherein generating the processed user speech comprises:
   removing at least one identified phrase from the user voice input.

5. The method of claim 4, further comprising:
   sending, to the user device, feedback associated with removing the at least one identified phrase.

6. The method of claim 1, wherein generating the processed user speech by processing the user voice input comprises:
   processing the user voice input using a natural language processing technique to convert the user voice input to text;
   identifying at least one filler word in one or more words of the text; and
   generating, based on removing the at least one filler word in the one or more words of the text, the processed user speech.

7. The method of claim 1, wherein generating the formatted user text includes:
   adding, based on identifying a computer language associated with the user handwritten input, formatting indicators to machine-encoded text generated from the user handwritten input.

8. A device, comprising:
   one or more memories; and
   one or more processors, coupled to the one or more memories, configured to:
      receive user voice input from a user device in a first virtual reality (VR) environment;
      receive user handwritten input from the user device in the first VR environment,
         wherein the user handwritten input is received based on an interaction with a computer-generated simulation of a three-dimensional environment to create a writing,
            wherein the user handwritten input is generated based on a user interaction with a user interface to simulate writing out a character, a word, or symbol, and
         wherein the user handwritten input is based on receiving at least one of the character, the word, or the symbol;
      generate processed user speech by processing the user voice input;
      generate formatted user text by processing the user handwritten input,
         wherein the formatted user text is generated by converting the at least one of the character, the word, or the symbol into one or more machine-encoded characters;
      cause the formatted user text to be visually presented in a second VR environment; and
      cause processed user speech to be audibly presented in the the second VR environment.

9. The device of claim 8, wherein the user voice input is received in real-time.

10. The device of claim 8, wherein the one or more processors are further configured to:
    obtain, from the user device, user movement input,
       wherein the user movement input comprises one or more user movements;
    determine that the user movement input is associated with one or more identifying traits;
    process the user movement input to remove at least one user movement, of the one or more user movements, based on the one or more identifying traits; and
    cause an avatar associated with a user to be depicted as moving based on the processed user movement input.

11. The device of claim 8, wherein the one or more processors, when generating the processed user speech, are configured to:
    remove at least one identified phrase from the user voice input.

12. The device of claim 11, wherein the one or more processors are further configured to:
send, to the user device, feedback associated with removing the at least one identified phrase.

13. The device of claim 8, wherein the one or more processors, when generating the processed user speech by processing the user voice input, are configured to:
process the user voice input using a natural language processing technique to convert the user voice input to text;
identify at least one filler word in one or more words of the text; and
generate, based on removing the at least one filler word in the one or more words of the text, the processed user speech.

14. The device of claim 8, wherein the one or more processors, when generating the formatted user text, are configured to:
add, based on identifying a computer language associated with the user handwritten input, formatting indicators to machine-encoded text generated from the user handwritten input.

15. A non-transitory computer-readable medium storing a set of instructions, the set of instructions comprising:
one or more instructions that, when executed by one or more processors of a device, cause the device to:
receive user voice input from a user device in a first virtual reality (VR) environment;
receive user handwritten input from the user device in the first VR environment,
wherein the user handwritten input is received based on an interaction with a computer-generated simulation of a three-dimensional environment to create a writing,
wherein the user handwritten input is generated based on a user interaction with a user interface to simulate writing out a character, a word, or symbol, and
wherein the user handwritten input is based on receiving at least one of the character, the word, or the symbol;
generate processed user speech by processing the user voice input;
generate formatted user text by processing the user handwritten input,
wherein the formatted user text is generated by converting the at least one of the character, the word, or the symbol into one or more machine-encoded characters;
cause the formatted user text to be visually presented in a second VR environment; and
cause the processed user speech to be audibly presented in the second VR environment.

16. The non-transitory computer-readable medium of claim 15, wherein the user voice input is received in real-time.

17. The non-transitory computer-readable medium of claim 15, wherein the one or more instructions, that cause the device to generate the processed user speech, cause the device to:
remove at least one identified phrase from the user voice input.

18. The non-transitory computer-readable medium of claim 17, wherein the one or more instructions further cause the device to:
send, to the user device, feedback associated with removing the at least one identified phrase.

19. The non-transitory computer-readable medium of claim 15, wherein the one or more instructions, that cause the device to generate the processed user speech by processing the user voice input, cause the device to:
process the user voice input using a natural language processing technique to convert the user voice input to text;
identify at least one filler word in one or more words of the text; and
generate, based on removing the at least one filler word in the one or more words of the text, the processed user speech.

20. The non-transitory computer-readable medium of claim 15, wherein the one or more instructions, that cause the device to generate the formatted user text, cause the device to:
add, based on identifying a computer language associated with the user handwritten input, formatting indicators to machine-encoded text generated from the user handwritten input.

* * * * *